United States Patent [19]

Mills

[11] Patent Number: 4,628,905

[45] Date of Patent: Dec. 16, 1986

[54] SOLAR SELECTIVE SURFACE COATING

[75] Inventor: David R. Mills, Darling Point, Australia

[73] Assignee: University of Sydney, Sydney, Australia

[21] Appl. No.: 726,180

[22] Filed: Apr. 23, 1985

Related U.S. Application Data

[63] Continuation of Ser. No. 537,288, Sep. 29, 1983, abandoned.

[30] Foreign Application Priority Data

Oct. 8, 1982 [AU] Australia ............................ PF6254

[51] Int. Cl.[4] .................................................. F24J 2/24
[52] U.S. Cl. .................................... 126/443; 126/901; 428/433
[58] Field of Search ............... 126/901, 417, 438, 442; 427/89, 102, 108, 160; 428/432, 433

[56] References Cited

U.S. PATENT DOCUMENTS

| | | | |
|---|---|---|---|
| 3,176,678 | 4/1965 | Langley | 126/901 |
| 3,176,679 | 4/1965 | Langley | 126/901 |
| 3,272,986 | 9/1966 | Schmidt | 126/901 |
| 3,920,413 | 11/1975 | Lowery | 126/901 |
| 4,029,853 | 6/1977 | McMahon et al. | 126/901 |
| 4,080,954 | 3/1978 | de Wilde et al. | 165/180 |
| 4,122,239 | 10/1978 | Riboulet et al. | 126/901 |
| 4,186,725 | 2/1980 | Schwartz | 126/901 |
| 4,234,654 | 11/1980 | Yatabe et al. | 428/333 |
| 4,286,009 | 8/1981 | Griest | 126/901 |
| 4,312,915 | 1/1982 | Fan | 126/417 X |
| 4,321,300 | 3/1982 | Farrauto et al. | 126/901 |
| 4,334,523 | 6/1982 | Spanoudis | 126/443 |
| 4,339,484 | 7/1982 | Harding | 126/417 X |
| 4,361,630 | 11/1982 | Johnson, Sr. | 126/901 |
| 4,416,916 | 11/1983 | Aykan et al. | 126/901 X |
| 4,437,455 | 3/1984 | Jefferson | 126/417 |
| 4,442,166 | 4/1984 | Fan | 126/417 |

FOREIGN PATENT DOCUMENTS 0035804 3/1980 Japan .................................. 126/901

OTHER PUBLICATIONS

Yadava, V. N. et al, "Variable Refractive Index Optical Coatings", Thin Solid Films, 17 (1973), pp. 243-252.
Mattox, D. et al, "High Absorptivity Solar Absorbing Coatings", Journal of Vac. Sci. Technology, vol. 11, No. 4, (Jul./Aug. 1974), pp. 793-796.

Primary Examiner—Samuel Scott
Assistant Examiner—H. A. Odar
Attorney, Agent, or Firm—Ladas & Parry

[57] ABSTRACT

A solar collector element having an inner tube through which a fluid can be passed, an outer glass tube enveloping the periphery of the inner tube and defining an evacuated space between the two tubes, and a solar selective surface coating deposited on the outer surface of the inner tube. The surface coating is deposited as three layers, an inner layer composed of a metal which exhibits high reflectivity in the infra-red spectral range, an outer layer composed of a material which behaves as a semiconductor at collector operating temperatures and an intermediate layer which is composed of a dielectric material. The materials of the respective layers are selected such that the refractive index mismatch between the inner layer and the intermediate layer is greater than it would be between the inner layer and the outer layer, in the absence of the intermediate layer, whereby the infra-red emittance of the collector element is reduced relative to that of an equivalent collector element having a two-layer selective surface coating.

13 Claims, 3 Drawing Figures

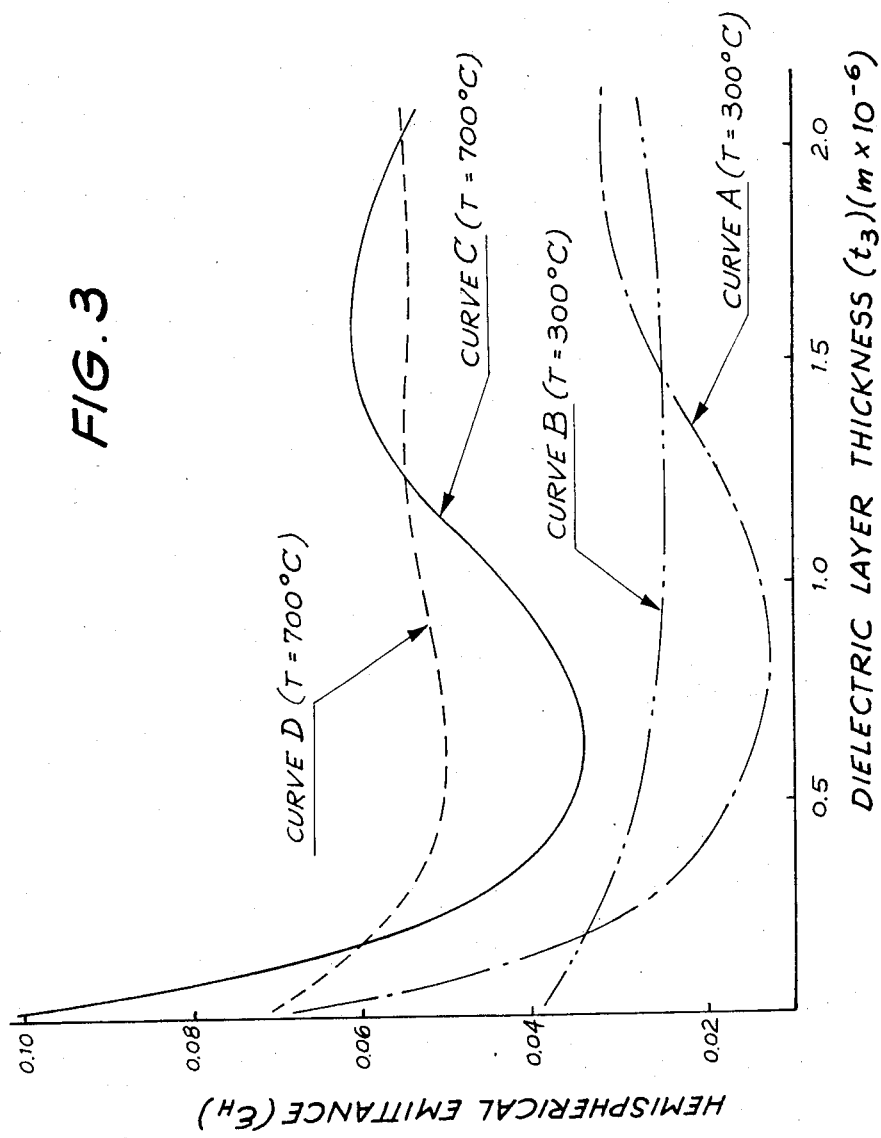

SOLAR SELECTIVE SURFACE COATING

This is a continuation of co-pending application Ser. No. 537,288 filed on Sept. 29, 1983, now abandoned.

FIELD OF THE INVENTION

This invention relates to a solar selective surface coating for absorber surfaces which are employed in solar collectors. In particular, the invention is directed to a solar selective surface coating which includes a refractive index mismatch layer for the purpose of reducing infra-red emittance.

BACKGROUND OF THE INVENTION

Solar selective surface coatings known in the art usually comprise an outer layer of a material which absorbs strongly in the solar energy spectral range but which is transparent to infra-red radiation. In the interest of reducing thermal losses, the outer layer is deposited on an inner layer of a material which provides high reflectivity and, hence, low emissivity in the infra-red spectrum. A typical such selective surface coating is disclosed in U.S. Pat. No. 4,339,484, the surface coating comprising a metal-carbide solar energy absorptive outer layer and a copper infra-red reflective base coating. The metal-carbide absorptive layer is graded such that it has a high carbide-to-metal ratio near its outer surface and a high metal-to-carbide ratio adjacent the interface between the absorptive surface and the reflective base coating.

A problem that is inherent in the traditional selective surface coatings is that the emissivity of the total surface coating is much higher than the emissivity of the reflective base layer alone. One of the major reasons for this is that the emissivity of a material increases if the optical constants of a superimposed medium are different from those of free space, and this normally is the case with materials that are employed for absorptive surface coatings. Such materials, if semiconductors, may have refractive indices in the order of 2 to 10 times greater than that of free space and, therefore, the coupling of infra-red radiation across the metal-semiconductor interface may be significantly greater than that of a metal-air interface.

SUMMARY OF THE INVENTION

The present invention seeks to alleviate this problem by providing a solar selective surface coating which comprises at least three layers; an inner layer composed of a material having high reflectivity and, hence, low emissivity in the infra-red spectral range, an outer layer composed of a material which is absorptive of energy in the solar energy spectral range and which is substantially transparent to infra-red radiation, and an intermediate layer composed of a maerial which is substantially transparent to infra-red radiation. The inner, outer and intermediate layer materials have complex refractive indices $(n_1-ik_1)$, $(n_2-ik_2)$ and $(n_3-ik_3)$ respectively and the materials are selected to satisfy the relationship $$\left[\frac{(n_3-ik_3)-(n_1-ik_1)}{(n_3-ik_3)+(n_1-ik_1)}\right]^2 > \left[\frac{(n_2-ik_2)-(n_1-ik_1)}{(n_2-ik_2)+(n_1-ik_1)}\right]^2$$

for normal incident radiation over at least a major portion of the infra-red spectral range.

With the above defined surface coating structure, the refractive index mismatch between the inner layer and the intermediate layer is greater than it would be between the inner layer and the outer layer (in the absence of the intermediate layer) and, therefore, less infra-red radiation will be coupled out of the inner layer. Stated in an alternative way, a higher value of infra-red reflectance is obtained at the interface of the inner and intermediate layers than would be attainable at the interface of a two-layer solar selective surface coating.

PREFERRED FEATURES OF THE INVENTION

The intermediate layer preferably is composed of a dielectric material which is highly transparent to infra-red radiation (i.e., having $k_3$ approximately equal to 0) and which has a real refractive index $n_3$ less than about 2.5. Suitable such materials include magnesium fluoride, magnesium oxide, titanium oxide, aluminium oxide, silica, quartz and carbon.

The outer layer preferably is composed of a material which behaves as a semiconductor at collector operating temperatures. Such material may have a monocrystalline, polycrystalline or amorphous structure and may comprise, for example, germanium, a germanium-silicon alloy, silicon carbide, lead sulphide, boron or, in the case of surface coatings to be employed in relatively low temperature collector systems, tellurium compounds. The material may alternatively be in the form of a cermet and, in such case, the material forming the dielectric matrix of the cermet may be the same as or different from the dielectric material which forms the intermediate layer of the surface coating.

Also, the outer layer preferably is graded, either geometrically or in terms of its composition, such that its refractive index to solar radiation increases with increasing depth of the layer and such that the maximum (real and imaginary) refractive indices ($n_2$ and $k_2$) occur adjacent the interface with the intermediate layer. Geometrical grading (i.e. texturing) may be achieved by chemically etching the outer layer of the surface coating.

Furthermore, the outer layer may be constituted by a number of sub-layers and include interference layers for the purpose of providing destructive interference to solar radiation. Similarly, the intermediate layer may include a number of sub-layers, but preliminary investigations tend to indicate that no benefit is to be gained from such a structure. However, the point to be noted is that, allowing for the possibility of sub-layers, the total surface structure may, in fact, include more than three layers.

The inner layer preferably comprises a metal, such as copper, aluminium, molybdenum, silver or gold which exhibits a high reflectance to infra-red radiation, and such metal layer, when composed of copper, would normally be deposited to a thickness of at least $0.10 \times 10^{-6}$ m.

The intermediate layer preferably is deposited to a minimum thickness of $0.15 \times 10^{-6}$ m., and the outer layer would normally be deposited to produce a solar energy absorptive layer having a thickness in the order of $0.3 \times 10^{-6}$ m. to $5.0 \times 10^{-6}$ m.

The inner, intermediate and outer layer materials which are employed in any given coating desirably should have coefficients of thermal expansion which are approximately equal, in order that the risk of differential movement at the interface between the layers might be minimised.

APPLICATION OF THE INVENTION

The solar selective surface coating may be applied to a flat plate-type collector surface. However, the surface coating would normally be applied to a tubular-type collector element having an inner (single or double ended) tube through which a heat exchange medium is caused to flow, an outer glass tube which envelopes the inner tube and an evacuated space between the two tubes. In the case of a tubular-type collector element, the surface coating would be deposited on the outer surface of the inner tube.

The inner tube may be formed from glass or metal, depending upon the intended operating temperature of the collector system. Glass would normally be employed for operating temperatures up to about 300° C. and metal for temperatures exceeding 300° C.

When a metal tube is employed, the tube itself may constitute the inner layer of the surface coating and, in such case, the intermediate layer would be deposited directly onto the outer surface of the metal tube. However, a stainless steel or titanium tube would normally be used and, due to the relatively high infra-red emittance of such metals, an inner layer of a low emittance metal would normally be coated onto the tube to form the inner layer.

Various techniques may be employed for depositing the respective layers of the surface coating onto the collector tube. For example, electron beam, magnetron sputtering, r.f. sputtering or, when appropriate, reactive sputtering deposition techniques may be employed for all layers. Alternatively, the inner layer may be applied by electroplating, dipping or vapour deposition techniques, whilst the intermediate layer may be applied by dipping and the outer layer may be applied by chemical vapour deposition. The technique employed will depend on the material used in the respective layers and the material from which the collector tube itself is formed.

The invention will be more fully understood from the following description of a preferred embodiment of a tubular collector element to which a three-layer solar selective surface coating is applied. The description is given with reference to the accompanying drawings in which:

BRIEF DESCRIPTION OF THE DRAWINGS

In the drawings:

FIG. 3 shows a family of curves which plot calculated (infra-red) emittance of the surface coating against thickness of an intermediate layer of the surface coating.

DETAILED DESCRIPTION OF THE INVENTION

Figure 1:
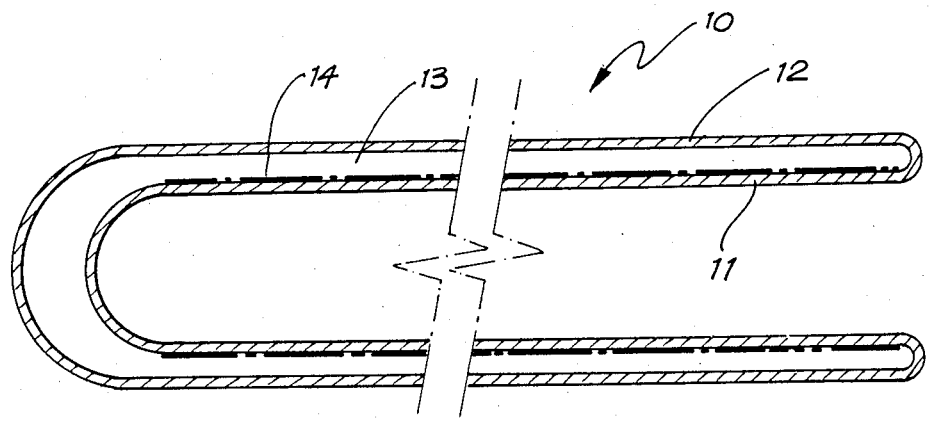
FIG. 1 shows a sectional elevation view of a glass collector element.

As illustrated in FIG. 1, the tubular collector element 10 comprises an inner (single-ended) glass tube 11 and an outer glass tube 12. The outer tube is joined (i.e., welded) to the open end of the inner tube in a manner such that the outer surface of the inner tube is enveloped by the outer tube, and the space 13 between the two tubes is subsequently evacuated.

Figure 2:
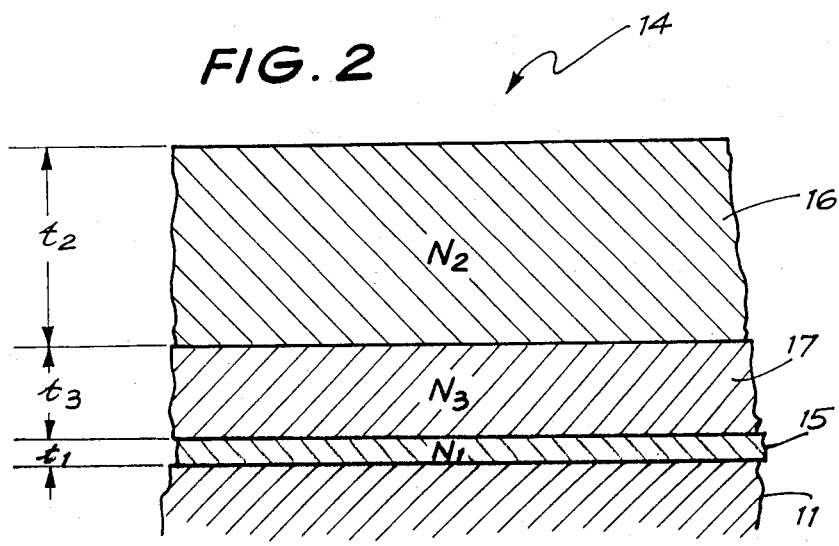
FIG. 2 shows a magnified view of a portion of the surface coating which is applied to the collector element.

The solar selective surface coating, which is indicated by the dash-dotted line 14 in FIG. 1, is deposited on the outer surface of the inner tube prior to the end-joining of the two tubes. The surface coating 14 is deposited as three discrete layers and, as shown in FIG. 2 the surface coating comprises:

(a) An inner layer 15 of copper which is deposited by a sputtering process to a thickness $t_1$ of about $0.10 \times 10^{-6}$ m., (b) An outer layer 16 of a semiconductor material which is deposited by a reactive sputtering process to a thickness $t_2$ of $2.0 \times 10^{-6}$ m., and (c) An intermediate layer 17 of a dielectric material which is reactively sputtered onto the inner layer to a thickness $t_3$ of $0.5 \times 10^{-6}$ m.

The respective layer materials have complex refractive indices:

$N1 = n_1 - ik_1$ for the copper layer 15, $N2 = n_2 - ik_2$ for the semiconductor layer 16, and $N3 = n_3 - ik_3$ for the (intermediate) dielectric material layer 17 and the materials are selected to satisfy the following relationship:

$$\left[ \frac{(n_3 - ik_3) - (n_1 - ik_1)}{(n_3 - ik_3) + (n_1 - ik_1)} \right]^2 > \left[ \frac{(n_2 - ik_2) - (n_1 - ik_1)}{(n_2 - ik_2) + (n_1 - ik_1)} \right]^2$$

for normal incident radiation over at least a major portion of the infra-red spectral range.

Suitable semiconductor and dielectric materials are silicon-germanium alloy and magnesium fluoride respectively.

FIG. 3 shows a family of analytically derived curves (A to D) which plot hemispherical emittance $\epsilon_H$ of infra-red radiation against thickness of the dielectric (intermediate) layer 17 in the coating of FIG. 2 for different operating temperatures. Curves A and B of FIG. 3 relate to the emittance of coatings which are subjected to an operating temperature of 300° C. and curves B and C relate to the emittance of coatings which are subjected to an operating temperature of 700° C. Curves A and C are applicable to a semiconductor material which has a relatively high refractive index ($n_2 \approx 6$), and curves B and D are applicable to a semiconductor material which has a relatively low refractive index ($n_2 \approx 3$).

It can be seen from these curves that the inclusion of the dielectric layer 17 contributes significantly to a reduction in the emittance of the coating and that benefits are to be derived from depositing the dielectric layer to a thickness of at least $0.25 \times 10^{-6}$ m. Particularly beneficial results are obtained from depositing the dielectric layer to a thickness $t_3$ in the order of $0.5 \times 10^{-6}$ m. to $1.5 \times 10^{-6}$ m.

I claim:

1. A collector element for use in a solar collector system and which comprises an inner tube through which fluid can be passed, an outer glass tube enveloping at least a portion of the periphery of the inner tube and defining an evacuated space between the two tubes, and a solar selective surface coating deposited on the outer surface of the inner tube; the solar selective surface coating comprising three layers including an inner layer composed of a material which is reflective to radiation in the infra-red spectral range, an outer layer composed of a semiconductor material which is absorptive of energy in the solar energy spectral range and which is substantially transparent to infra-red radiation, and an intermediate layer composed of a dielectric material which is substantially transparent to infra-red radiation, the outer layer material being deposited to a thickness not less than 0.3 μm, the intermediate layer material being deposited to a thickness within the range of about 0.15 to 2.0 μm, the inner outer and intermediate layer materials having complex refractive indices $(n_1-ik_1)$, $(n_2-ik_2)$ and $(n_3-ik_3)$ respectively and the materials being selected to satisfy the relationship $$\left[\frac{(n_3-ik_3)-(n_1-ik_1)}{(n_3-ik_3)+(n_1-ik_1)}\right]^2 > \left[\frac{(n_2-ik_2)-(n_1-ik_1)}{(n_2-ik_2)+(n_1-ik_1)}\right]^2$$

for normal incident radiation over at least a major portion of the infra-red spectral range, wherein $n_1$, $n_2$ and $n_3$ are the respective real refractive indices; $k_1$, $k_2$ and $k_3$ are the respective imaginary refractive indices, and i is $\sqrt{-1}$.

2. A collector element as claimed in claim 1 wherein the inner tube is a glass tube.

3. A collector element as claimed in claim 1 wherein the inner tube is a metal tube.

4. A collector element as claimed in claim 1 wherein the inner layer is composed of a metal selected from the group consisting of copper, aluminium, molybdenum, silver and gold and wherein the inner layer is deposited to a thickness not less than 0.10 μm.

5. A collector element as claimed in claim 1 wherein the intermediate layer is composed of a material selected from the group consisting of magnesium fluoride, magnesium oxide, titanium oxide, aluminium oxide, silica, quartz and carbon.

6. A collector element as claimed in claim 1 wherein the outer layer is composed of a material selected from the group consisting of germanium, germanium-silicon alloy, silicon carbide, lead sulphide and boron.

7. A collector element as claimed in claim 1 wherein the outer layer has a thickness falling within the range 0.3 μm to 5.0 μm.

8. A collector element as claimed in claim 1 wherein the outer layer is graded as to its composition such that the refractive index to solar radiation increases with increasing depth of the layer.

9. A collector element as claimed in claim 1 wherein the outer layer is graded geometrically by etching the outermost surface of the coating whereby the refractive index to solar radiation increases with increasing depth of the layer.

10. A collector element as claimed in claim 1 wherein the outer layer is composed of a cermet.

11. A collector element as claimed in claim 10 wherein the intermediate layer is composed of a dielectric material which has the same composition as a material forming the dielectric matrix of the cermet.

12. A solar energy collector absorber having a solar selective surface comprising three superimposed layers including an inner layer composed of a material which is reflective to radiation in the infra-red spectral range, an outer layer composed of a semiconductor material which is absorptive of energy in the solar energy spectral range and which is substantially transparent to infra-red radiation, and an intermediate layer composed of a dielectric material which is substantially transparent to infra-red radiation, the outer layer material being deposited to a thickness not less than 0.3 μm, the intermediate layer material being deposited to a thickness within the range of about 0.15 to 2.0 μm, the inner, outer and intermediate layer materials having complex refractive indices $(n_1-ik_1)$, $(n_2-ik_2)$ and $(n_3-ik_3)$ respectively and the materials being selected to satisfying the relationship $$\left[\frac{(n_3-ik_3)-(n_1-ik_1)}{(n_3-ik_3)+(n_1-ik_1)}\right]^2 > \left[\frac{(n_2-ik_2)-(n_1-ik_1)}{(n_2-ik_2)+(n_1-ik_1)}\right]^2$$

for normal incident radiation over at least a major portion of the infra-red spectral range, wherein $n_1$, $n_2$ and $n_3$ are the respective real refractive indices; $k_1$, $k_2$ and $k_3$ are the respective imaginary refractive indices; and i is $\sqrt{-1}$.

13. A solar energy collector absorber as claimed in claim 12 wherein said inner layer is deposited onto a surface of the absorber.

* * * * *